No. 721,531. PATENTED FEB. 24, 1903.
H. A. ALSTON.
MOUSE OR RAT TRAP.
APPLICATION FILED MAY 9, 1902.
NO MODEL. 2 SHEETS—SHEET 1.

Witnesses:
E. B. Bolton
Thos. W. Aldorn

Inventor:
Harry Alexander Alston
By Richards & Co
his Attorneys.

No. 721,531. PATENTED FEB. 24, 1903.
H. A. ALSTON.
MOUSE OR RAT TRAP.
APPLICATION FILED MAY 9, 1902.
NO MODEL. 2 SHEETS—SHEET 2.

Witnesses: Inventor:
Harry Alexander Alston
By Richards & Co.
his Attorneys.

UNITED STATES PATENT OFFICE.

HARRY ALEXANDER ALSTON, OF CAPE TOWN, CAPE COLONY.

MOUSE OR RAT TRAP.

SPECIFICATION forming part of Letters Patent No. 721,531, dated February 24, 1903.

Application filed May 9, 1902. Serial No. 106,637. (No model.)

*To all whom it may concern:*

Be it known that I, HARRY ALEXANDER ALSTON, farmer, of 4 Barkly Terrace, Cape Town, Cape Colony, have invented a new and useful Improved Mouse or Rat Trap, which is fully set forth in the following specification, reference being had to the accompanying drawings.

Figure 1:
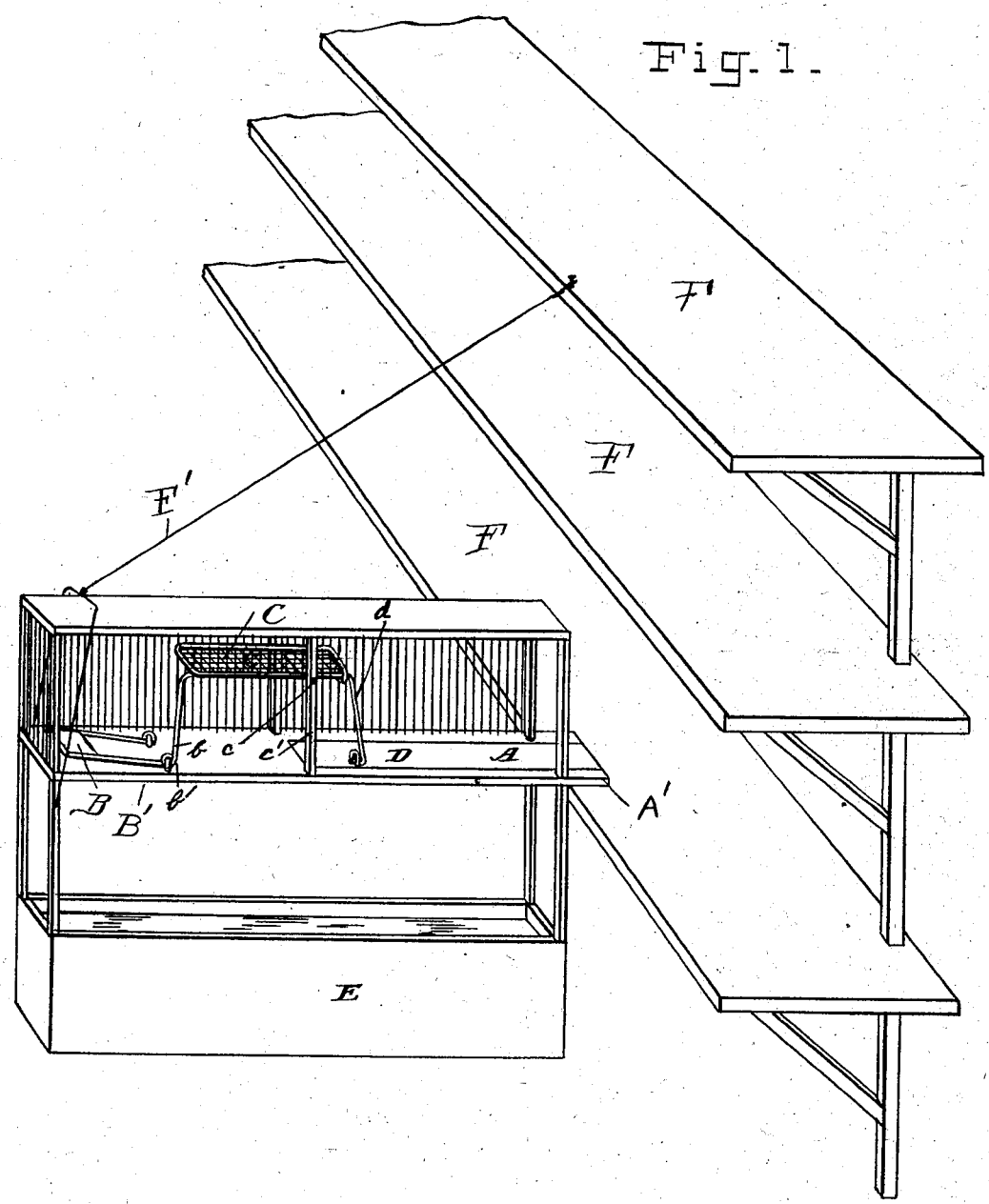
Figure 2:
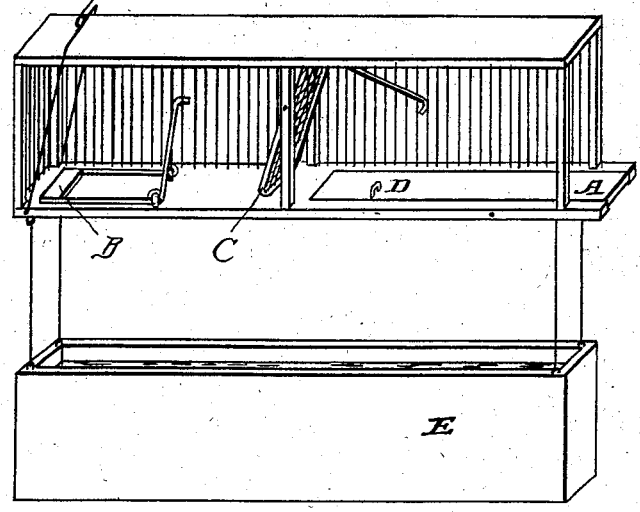
Figure 3:
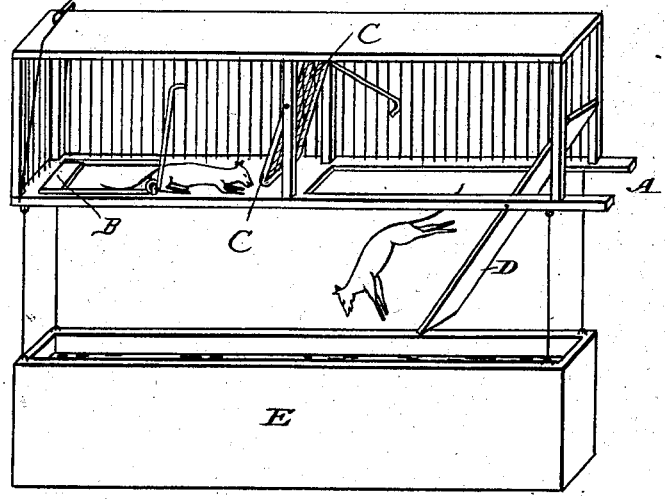

Figure 1 is a view of the trap when set, showing its attachments to a shelf by means of a loop or wire. Fig. 2 shows the trap after the first mouse has passed through to the point B. Fig. 3 shows the position of the mouse after having fallen into the tank.

Referring to Fig. 1, A is the entrance to the trap, which will allow the first mouse to pass through to B, where bait is attached. The door C and trap-door D are kept in position, as shown at Fig. 1. The door C, which is of open-work, as shown, and is pivoted at $c$ to the vertical bars $c'$, is held up by a bell-crank rod $b$, which has an upper bent end resting under the end of the door. The bell-crank rod is suitably pivoted at $b'$, and its horizontal portion is connected to a tread-plate B, which when the parts are in the position shown in Fig. 1 is raised above the floor B'. A bait may be suspended in any suitable manner over the tread-plate, and when a mouse has passed up to the bait its weight on the tread-plate causes the end of the bell-crank rod to pass from under the door C. The door being thus released drops by reason of a weight or spring attached thereto. When the door drops, the hooked rod $d$, which keeps the trap-door up, is released from the eyelet or loop $d'$. The trap-door is so balanced that it remains in the same position as when it was connected by the pin. Reference to Fig. 2 shows the position of the doors at this stage. On the door C dropping the mouse, which has passed to the bait, is confined to the cage and acts as a decoy to other mice. When the second mouse passes through at A, it cannot proceed farther than about the center of the trap-door D, its weight thereon causing the trap-door to tilt, precipitating the mouse into the water in the tank or other vessel, as shown in Fig. 3. The trap-door by reason of its balance returns to its original position and is ready for further action.

Attached to the trap, as before stated, is a tank or other vessel containing water. Its position is shown at E. The tank should only be filled with water up to the lines, as shown, in order not to wet the end of the trap-door when it drops.

The apparatus also applies to field mice and rats. For field-mice a hole should be made to the full depth of the water-tank E, leaving the trap above the ground.

When it is required to set the trap on a floor in a room, the tank may be disconnected and the door C set, as in Fig. 1; but as by this means only one mouse could be caught at a time it is better to use the tank attached and place books or anything else to the level of the entrance.

The tank may be attached to the trap by means enabling it to be disconnected when it is required to fill or empty the tank.

The trap-door should be made of tin to avoid swelling.

The door C may be made of wire in order that the second mouse might see the decoy mouse.

The trap can be used with or without the decoy. In the latter case the bait could be attached to the opposite inner end of the trap-door and the door C not set.

In Fig. 1 I have shown the trap applied to a set of pantry-shelves F, a projecting part A' at one end resting on one of the shelves and a cord F' connecting the other end to an upper shelf.

I claim as my invention—

In a mouse-trap, a water-tank, an elongated chamber above the same having an open end, a trap-door in the bottom of said chamber, a door in advance of said trap-door adapted to divide said chamber into two compartments, and means for effecting the closing of said door for confining the mouse in the front compartment, substantially as described.

In witness whereof I have hereunto set my hand in presence of two witnesses.

HARRY ALEXANDER ALSTON.

Witnesses:
EDGAR JAMES BOYES,
CHARLES FREDERICK BROWN.